United States Patent
Franzaroli (10) Patent No.: US 9,546,045 B2
(45) Date of Patent: Jan. 17, 2017

(54) CONVEYOR

(71) Applicant: PULSAR S.R.L., Castel Maggiore (Bologna) (IT)

(72) Inventor: Massimo Franzaroli, Castel Maggiore (IT)

(73) Assignee: PULSAR S.R.L., Castel Maggiore (Bologna) (IT)

( * ) Notice: Subject to any disclaimer, the term of this patent is extended or adjusted under 35 U.S.C. 154(b) by 0 days.

(21) Appl. No.: 14/356,237

(22) PCT Filed: Nov. 5, 2012

(86) PCT No.: PCT/IB2012/056165
§ 371 (c)(1),
(2) Date: May 5, 2014

(87) PCT Pub. No.: WO2013/068908
PCT Pub. Date: May 16, 2013

(65) Prior Publication Data
US 2014/0311874 A1    Oct. 23, 2014

(30) Foreign Application Priority Data
Nov. 7, 2011   (IT) .............................. B020110089 U (51) Int. Cl.
*B65G 15/60*   (2006.01)
*B65G 21/10*   (2006.01)
(Continued)

(52) U.S. Cl.
CPC ............... *B65G 15/60* (2013.01); *B65G 15/00* (2013.01); *B65G 21/06* (2013.01); *B65G 21/10* (2013.01); *B65G 41/001* (2013.01)

(58) Field of Classification Search
CPC ......... B65G 15/00; B65G 15/60; B65G 21/06; B65G 21/10; B65G 41/001
(Continued)

(56) References Cited

U.S. PATENT DOCUMENTS 3,511,358 A * 5/1970 Peterson ................... A21B 3/07
                                                        198/632
3,921,793 A * 11/1975 Hutchinson ............ B65G 23/44
                                                        198/813
(Continued)

FOREIGN PATENT DOCUMENTS

DE      196 44 010 A1     5/1998
DE   20 2010 011357 A1    11/2010
(Continued)

OTHER PUBLICATIONS

International Search Report, dated Feb. 19, 2013, from corresponding PCT application.

*Primary Examiner* — Timothy Waggoner
*Assistant Examiner* — Keith R Campbell
(74) *Attorney, Agent, or Firm* — Young & Thompson (57) ABSTRACT

A conveyor (10) for transporting products, in particular in dusty environments, especially in tissue paper processing installations, includes one or more conveyor belts (12) in particular of a mobile type, for transporting the product between one or more pickup and/or release points, includes a mounting frame (11) for the respective conveyor belt (12) which includes a respective frame (13) for supporting an endless band (14) which transports the product and which runs on corresponding guide and slide elements. The conveyor includes band sliding elements (15) which can be moved between a normal position where the band (14) is engaged and retained and a position where the selfsame band (14) is disengaged.

21 Claims, 10 Drawing Sheets

(51) Int. Cl.
*B65G 21/06* (2006.01)
*B65G 15/00* (2006.01)
*B65G 41/00* (2006.01)

(58) Field of Classification Search
USPC .... 198/813, 814, 815, 816, 861.1, 842, 843, 198/810.04
See application file for complete search history.

(56) References Cited

U.S. PATENT DOCUMENTS

| | | | | |
|---|---|---|---|---|
| 4,561,538 A | * | 12/1985 | Zwiebel | B65G 23/44 198/816 |
| 5,022,514 A | * | 6/1991 | Lofberg | B65G 15/00 198/813 |
| 6,708,813 B2 | * | 3/2004 | Takahashi | B65G 47/647 198/369.2 |
| 6,803,529 B2 | * | 10/2004 | Takahashi | B65G 15/00 177/119 |
| 7,383,944 B2 | * | 6/2008 | Hall | B65G 21/00 198/816 |
| 7,549,531 B2 | * | 6/2009 | Hosch | B65G 21/105 198/493 |
| 7,650,729 B2 | * | 1/2010 | Whittlesey | A22C 11/02 198/813 |
| 7,806,254 B2 | * | 10/2010 | Brayman | B65G 15/00 198/461.1 |
| 8,146,734 B2 | * | 4/2012 | Shoji | B65G 21/10 198/813 |
| 8,469,182 B2 | * | 6/2013 | Alotto | B65G 23/44 198/813 |
| 2002/0157877 A1 | | 10/2002 | Takahashi | |

FOREIGN PATENT DOCUMENTS

| | | |
|---|---|---|
| JP | 2001 080718 A | 3/2001 |
| JP | 2011 037612 A | 2/2011 |
| JP | 2011037612 * | 2/2011 |

* cited by examiner

CONVEYOR

TECHNICAL FIELD

This invention relates to a conveyor.

BACKGROUND ART

Conveyors for transporting rolls of toilet paper, paper towels for personal and/or general household use, packs of paper napkins, tissues and the like are known which comprise one or more conveyor belts, in particular of a mobile type, for transporting the product between one or more pickup and/or release points.

Generally speaking, these prior art conveyors comprise a mounting frame for the respective conveyor belt which comprises a frame for supporting an endless band which transports the product and which runs on corresponding guide and slide means.

Particularly in dusty production environments, such as those where paper rolls or tissues are processed, paper dust and residue tend to accumulate under the endless bands and between the rollers on which the bands run. This leads to problems with belt operation as a result of added friction and loss of conveyor flatness and consequent risks of the products falling off the conveyor.

To overcome these problems in prior art conveyors, the rollers of the conveyor frame must be disassembled using specific keys and screwdrivers and involving time-consuming and painstaking work for the personnel in charge of the operations.

In practice, these cleaning or maintenance operations are postponed as much as possible, with consequent malfunctioning of the conveyors for extended lengths of time.

These problems are felt particularly strongly in the tissue paper field, where the paper processed to make rolls of toilet paper or paper towels, paper napkins and tissues for personal or general household use produces considerable amounts of dust and residues which find their way insidiously into every gap and space in the processing machines and equipment, particularly in the conveying systems.

Replacing worn rollers on which the band runs is another time-consuming and troublesome task.

Indeed, in such cases, too, the roller to be replaced has to be removed using specific tools, in particular, keys and screwdrivers, to disengage the roller from the conveyor and put a new one in its place on the conveyor.

AIM OF THE INVENTION

This invention therefore proposes a new and alternative solution with respect to the solutions known up to now and proposes to overcome one or more of the above mentioned drawbacks and/or problems and/or to meet one or more of the needs mentioned in, or inferable from, the above. It is accordingly provided a conveyor for transporting products, in particular in dusty environments, especially in tissue paper processing installations, the products being, more specifically, rolls of toilet paper, paper towels for personal and/or general household use, packs of paper napkins, tissues and the like, the conveyor comprising one or more conveyor belts, in particular of a mobile type, for transporting the product between one or more pickup and/or release points, the conveyor comprising a mounting frame for the respective conveyor belt, the conveyor belt in turn comprising a frame for supporting an endless band which transports the product and which runs on corresponding guide and slide means; characterized in that it comprises band sliding means which can be moved between a normal position where the band is engaged and retained and a position where the selfsame band is disengaged.

That way, the endless band can be easily disengaged so that cleaning and maintenance of the guide and slide means can be conveniently carried out.

BRIEF DESCRIPTION OF THE DRAWINGS

This and other innovative aspects are set out in the appended claims and the technical features and advantages are apparent from the detailed description which follows of a non-limiting example embodiment of the invention with reference to the accompanying drawings, in which:

DETAILED DESCRIPTION OF THE PREFERRED EMBODIMENT OF THE INVENTION

Figure 1:
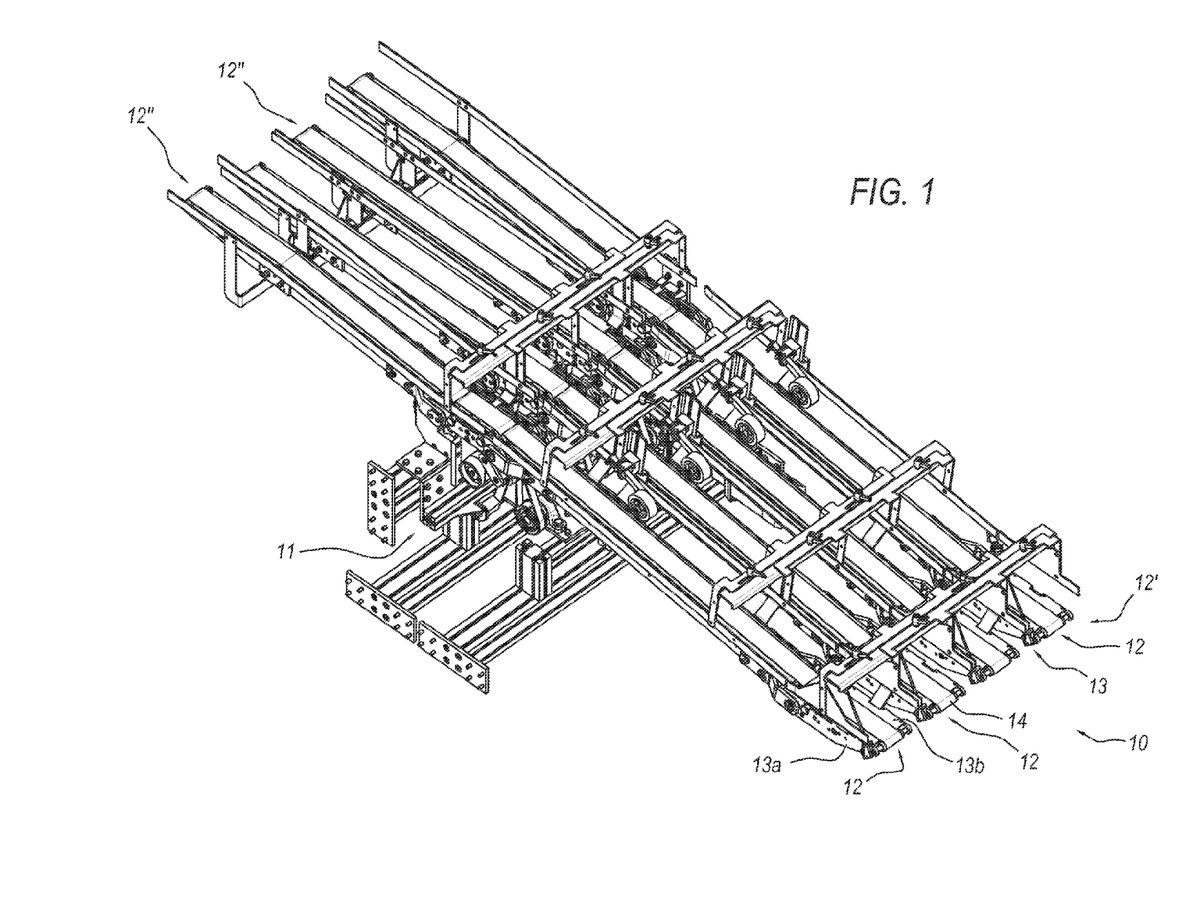
FIG. 1 is a perspective view of a preferred embodiment of a conveyor according to this invention.

FIG. 1 illustrates a preferred embodiment 10 of a conveyor for transporting products, in particular in dusty environments, especially in tissue paper processing installations, the conveyor being designed to transport products which are, in particular, in the form of rolls of toilet paper, paper towels for personal or general household use, as well as packs of paper napkins, tissues and the like.

The conveyor 10 comprises one or more conveyor belts 12, in particular of a mobile type and designed for transporting the product between one or more product pickup and/or release points.

As illustrated, the conveyor 10 comprises a mounting frame 11 for the respective conveyor belt 12, the conveyor belt 12 having an upstream end 12' and a downstream end 12" which is mobile, in particular mobile vertically, and a respective mobile frame 13 for supporting an endless band 14 which transports the product and which runs on corresponding guide and slide means.

More specifically, the conveyor 10 comprises one or more conveyor belts 12, which have a respective mobile downstream end 12" designed to deliver the product to a plurality of conveyors, in particular a first and a second conveyor, located at different heights, which carry the products to different points of use, in particular to different packaging machines.

Figure 2:
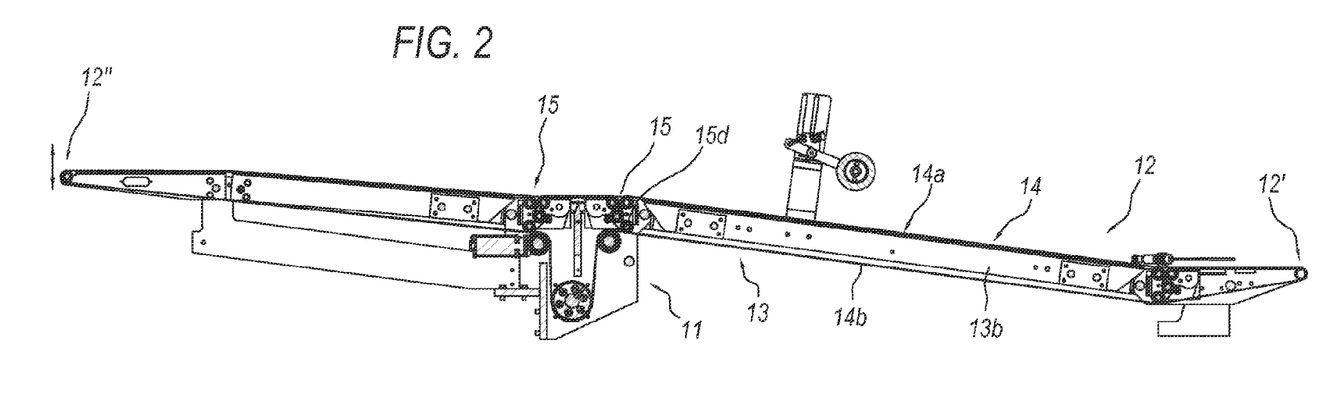
FIG. 2 is a longitudinal cross section of a preferred embodiment of a conveyor belt used in the conveyor according to this invention.

The frame 13 supporting the product transporting band comprises, as shown also in FIG. 2, a first and a second elongate flank 13a, 13b, made in two or more parts which are movable relative to each other in order to allow the downstream end 12" of the respective belt 12 to be lifted and lowered.

The frame 13 of the respective conveyor belt 12 supports, between the flanks 13a and 13b, the band guide and slide means, in particular in the form of roller means.

As may be inferred, also with reference in particular to FIG. 2, the transporting band 14 has an active upper section 14a which feeds the product between the upstream end where the product is picked up and the downstream end where the product is released, and a passive lower return section 14b.

Advantageously, means 15 for sliding the band 14 are provided which can be moved between a position where the band 14 is engaged and retained and a position where the selfsame band 14 is disengaged.

That way, personnel at work can quickly and easily take action to remove the dust and residues which have found their way under the band and between the guide and slide means of the selfsame band.

More specifically, means are advantageously provided for engaging or retaining the band sliding means in the band engaged and retained position, these engagement or retaining means being advantageously of a quick release type so as to allow the sliding means 15 to be quickly and easily moved to the position where the band 14 is disengaged.

More specifically, as will become clearer as this description continues, the means for engaging or retaining the sliding means in the band engaged or retained position can be released or disengaged manually.

That way, the operation can be carried out quickly and easily without having to use specific tools.

Also, advantageously, the engagement or retaining means can be set manually to the engaged and locked position where the sliding means engage and retain the band.

That way, the operation can be carried out quickly and easily without having to use specific tools.

More specifically, the engagement or retaining means can be set manually to the disengaged position by a single continuous action of the user's hand.

More specifically, the engagement or retaining means can be set manually to the disengaged position by a single continuous translational action of the user's hand.

Figure 3A:
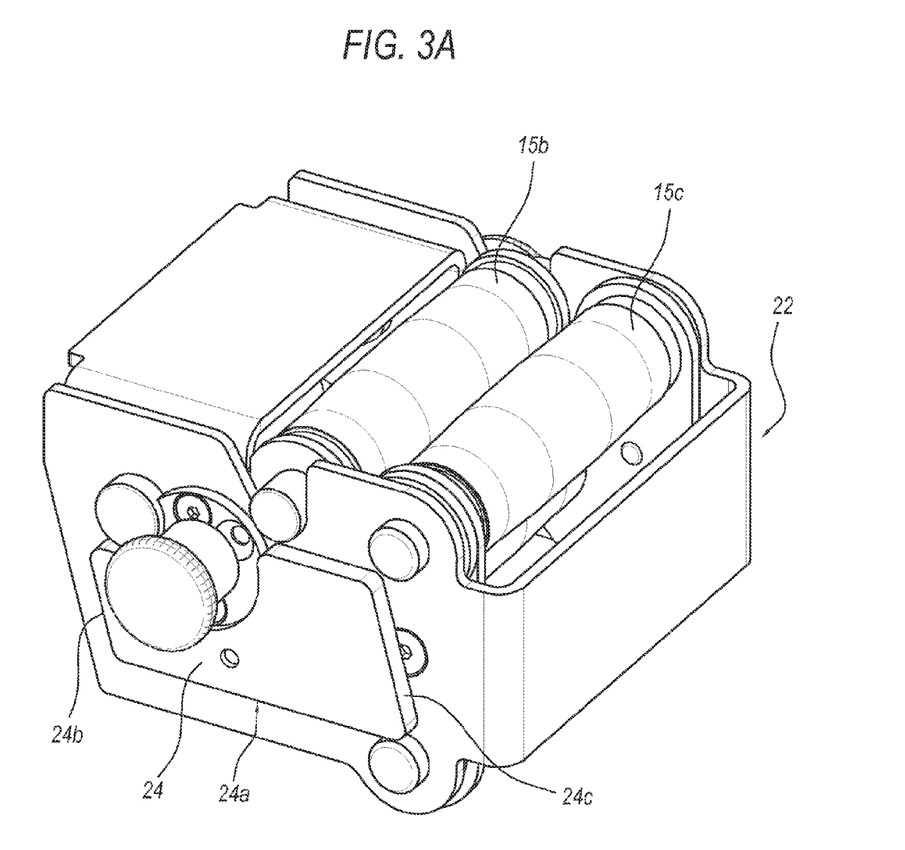
FIGS. 3A and 3B are perspective views showing the mounting block of the sliding rollers used in the conveyor belt according to the invention respectively in a closed condition, where the endless band is engaged and retained, and in an open position, where the endless belt is disengaged, or released.
Figure 3B:
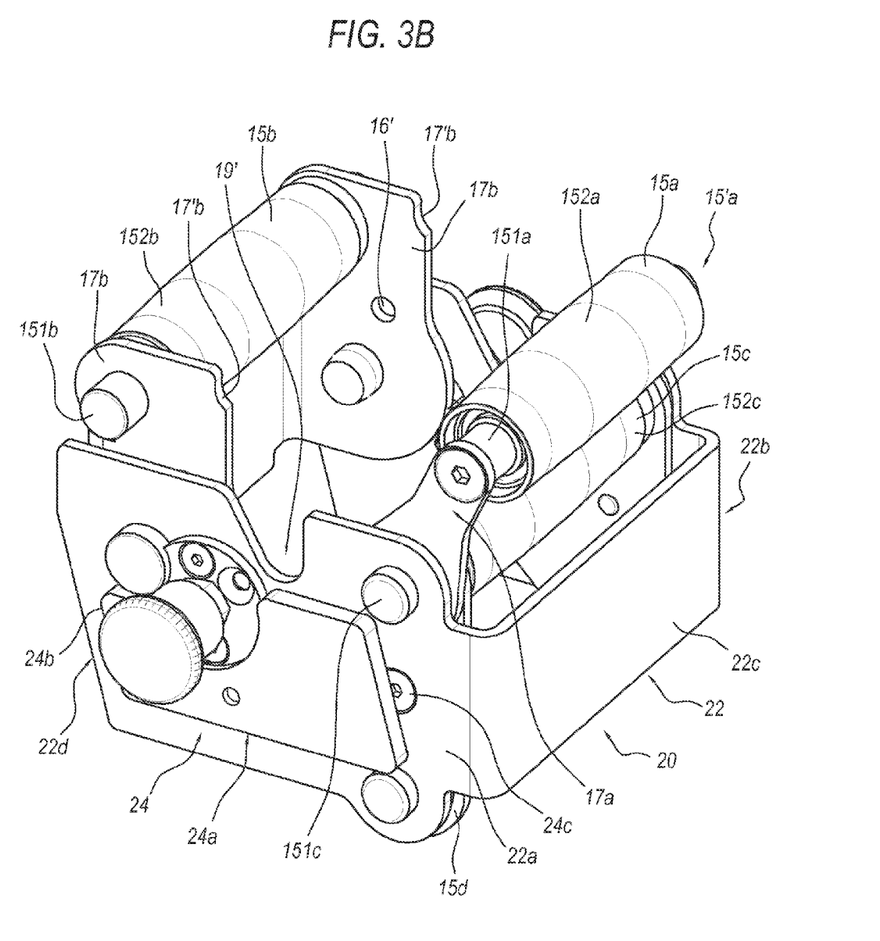
Figure 4A:
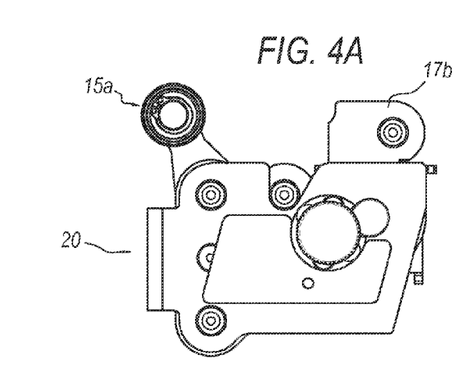
FIGS. 4A, 4B, 4C and 4D are, respectively, a side view, a bottom plan view, a longitudinal cross section and a transverse cross section through the line IVD-IVD of FIG. 4C, of the block for the sliding rollers.
Figure 4B:
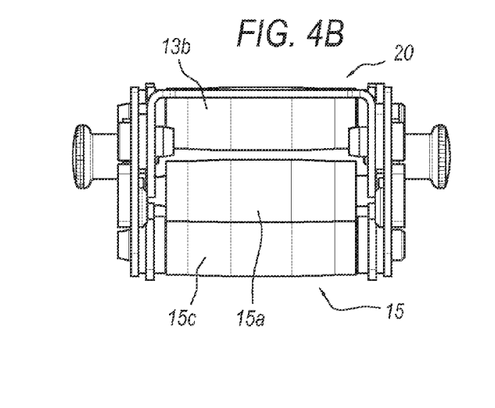
Figure 4C:
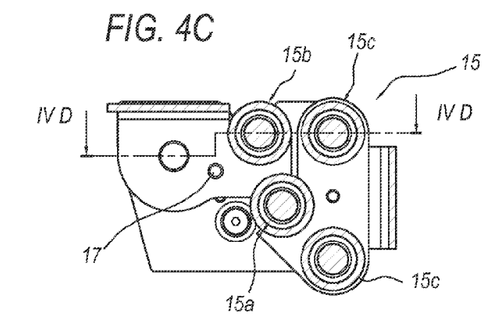
Figure 4D:
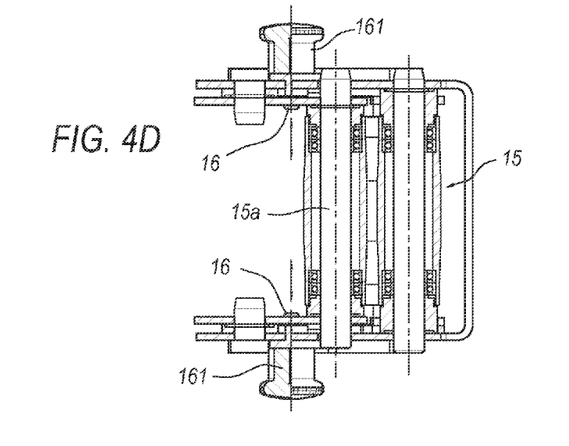

More specifically, as may be inferred from FIG. 4D, the engagement or retaining means comprise an element, in particular a pin 16 for engaging a corresponding surface, in particular a hole 17 of the mobile supporting means of the corresponding sliding means 15, as illustrated in FIG. 3B.

Advantageously, the engagement element or pin 16 is designed to perform a translational movement, in particular, in a direction transversal to the belt 12.

More specifically, the means 15 for sliding the band 14 can be moved between a normal, lowered position where the band 14 is engaged and retained and a raised position, in particular raised vertically, where the selfsame band 14 is disengaged, as will become clearer as this description continues.

As will become clearer as this description continues, a mounting block 20 is provided for the sliding means 15 of the endless band 14.

More specifically, mobile mounting means are advantageously provided for the sliding means 15 of the band 14 which comprise a roller 15a for pulling the band 14 and which is spaced, in particular perpendicularly spaced and under the product conveying or transporting surface and which defines a path of the band 14 which is downwardly recessed relative to the product conveying or transporting surface.

The sliding means 15 also comprise a roller, in particular first and second backing rollers 15b, 15c for the band 14, located at the level of the product conveying surface, that is to say, defining the product transporting surface. The roller 15a for pulling the band 14 creates a recessed path for the band 14 with and between the opposite first and second backing rollers 15c, 15b for the band 14, at the level of the product transporting surface.

Advantageously, the pulling roller 15a is movable between an engaged position where it applies a pulling action to the band 14 and a disengaged position where it does not apply a pulling action to the band 14, allowing the band 14 to be released from the roller so that cleaning and/or maintenance operations can be conveniently carried out on it.

Movable support means 17a are provided for the pulling roller 15a of the band 14.

The supporting means for the pulling roller 15a of the band comprise a respective arm 17a which supports a shaft 151a for rotatably supporting the surface, or cylindrical element, 152a for engaging and sliding the band 14, the supporting arm 17a being movable, in particular being suitably pivoted to corresponding supporting means, in order to move the pulling roller 15a of the band between the position, in particular the lowered position, where the band 14 is engaged or pulled, and the position, in particular the raised position, where the band 14 is released from the pulling action.

More specifically, the movable supporting arm 17a of the pulling roller of the band is conveniently pivoted coaxially with the rotatable supporting shaft 151c of a roller 15c for backing the band at the level of the product transporting surface.

The roller 15c thus has a respective fixed shaft 151c which rotatably supports a surface, or cylindrical element, 152c for sliding the band 14. Advantageously, the roller 15a of the band 14 has a free end 15'a from which the band 14 can be freely removed when the roller 15a is in the position, in particular the raised position, where the band 14 is released.

Means are advantageously provided for locking the pulling roller 15a of the band 14 in the engaged position where a pulling action is applied to the band 14.

The locking means are releasable to allow the pulling roller 15a to reach the position where the band 14 is released from the pulling action.

The first roller 15b for backing the band at the level of the product transporting surface is movable between a position, in particular a lowered position, where the band 14 is engaged, and a position, in particular a raised position, where the band 14 is released from the pulling action.

More specifically, the roller 15b for backing the band 14 is movable between a lowered position where the band 14 is engaged and a raised position where the band 14 is released.

The roller 15b for backing the band at the level of the product transporting surface is movable between a position, in particular a lowered position, where the pulling roller 15a is locked, and a position, in particular a raised position, where the pulling roller 15a is released.

Movable support means 17b are provided for the backing roller 15b of the band 14.

More specifically, the support means of the band backing roller 15b comprise a respective arm, in particular first and second opposite arms 17b, 17b, which, at a respective end, support the shaft 151b for rotatably supporting the surface, or cylindrical element, 152b for sliding the band 14 of the roller 15b. Each arm 17b, 17b is movable in order to carry the backing roller 15b between the position where the band 14 is engaged and a pulling action is applied to it and the position where the band 14 is released from the pulling action.

The movable arm, in particular the first and second movable arms 17b, 17b, for supporting the band backing roller 15b are conveniently pivoted to a corresponding mounting means, or block.

The second roller 15c for backing the band 14 at the level of the product transporting surface in turn comprises a respective rotating shaft 151c which is fixed to corresponding supporting means, as will become clearer as this description continues.

As illustrated, the movable arm, in particular the first and second movable arms 17b, 17b, for supporting the band backing roller 15b is, or are, conveniently pivoted at the same height as the shaft 151c for supporting the second backing roller 15c.

As illustrated, the shaft 151b of the movable backing roller 15b can be inserted and housed in the corresponding supporting seat 19', open at the top, which is formed in a corresponding supporting means, or block, of the sliding and guide means 15.

The arm, in particular the first and second movable arms 17b, 17b, for supporting the band backing roller 15b, has an end, in particular a shaped or arcuate end 17'b, 17'b for engaging the shaft 151a of the band pulling roller 15a to define means for locking the selfsame pulling roller 15a in the position where the band 14 is engaged and a pulling action is applied to it Thus, retaining means are provided for the movable backing roller 15b of the band 14 in the position where the band is engaged and a pulling action is applied to it, these retaining means being conveniently releasable to allow the roller to reach the position where the band is released from the pulling action and where the band pulling roller 15a is released, or disengaged, so that it too can reach the position where it releases the band 14.

More specifically, the means for retaining the movable backing roller 15b of the band 14 in the position where the band is engaged and a pulling action is applied to it comprise a pin 16, in particular a first and a second movable pin 16, 16 for engaging and disengaging a corresponding surface, in particular a surface defining a respective hole 16', 16' for insertion of the corresponding pin 16, 16, located on the respective movable supporting arm 17b, 17b of the backing roller 15b, in order to lock the roller 15b in the working or retained position of the band or to release the roller to the position where the selfsame band 14 is disengaged, respectively.

Each pin, in particular each of the first and second pins 16, 16 is supported and actuated by a corresponding knob 161, 161, which is connected to the means which support the sliding block, as will become clearer as this description continues.

Each actuating knob 161, 161 protrudes laterally from the mounting means, or casing, of the sliding means 15, or block, as will become clearer as this description continues.

Elastic means are provided for pushing the element, or pin 16, for retaining the movable backing roller 15b in the position where the band 14 is engaged and a pulling action is applied to it.

These elastic means for pushing the element, or pin 16, for retaining the movable backing roller 15b in the position where the band 14 is engaged and a pulling action is applied to it are provided between the actuating knob 161, 161 and the respective slidable connection means thereof, in particular for connection to the block 20.

Each knob 161, 161 for actuating the retaining pin is designed to be placed in a corresponding receiving seat, labelled 161', provided in the belt supporting means, or flanks, and, more specifically, protrudes laterally from the flanks 13a, 13b of the means for supporting the band 14.

The first and second knobs 161, 161 protrude laterally from the belt and can be operated manually in such a way as to pull the respective belt outwards to disengage the respective pin 16, 16 from the hole 16', 16' of the respective supporting arm of the backing roller 15b.

Figure 6A:
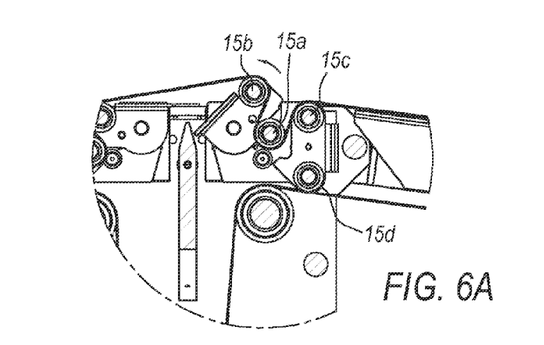
Figure 6B:
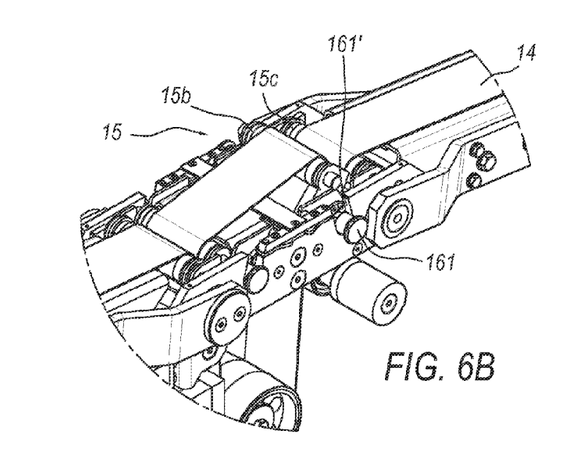
Figure 7A:
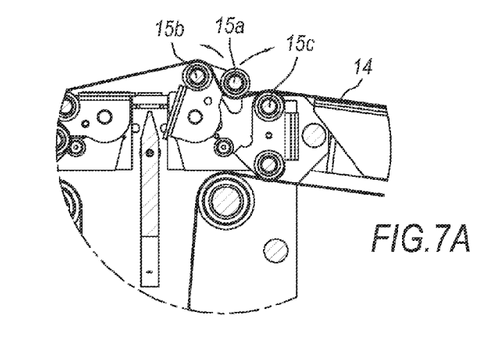
Figure 7B:
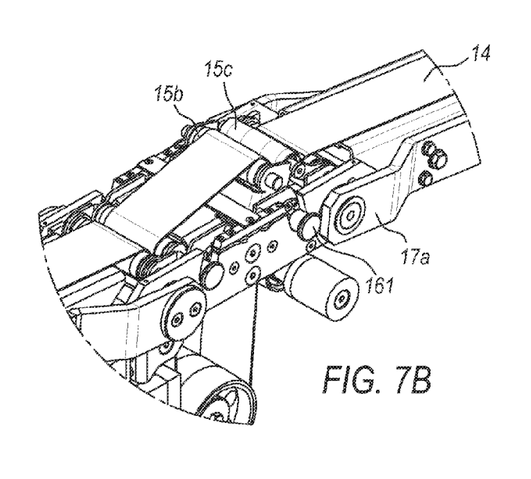
Figure 8A:
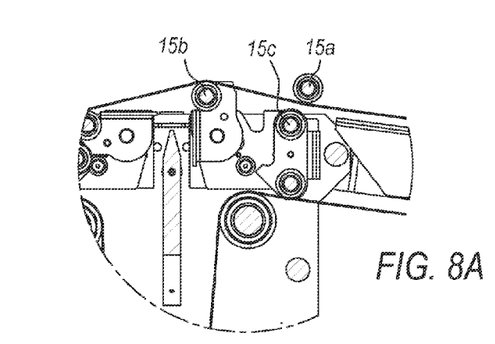
Figure 8B:
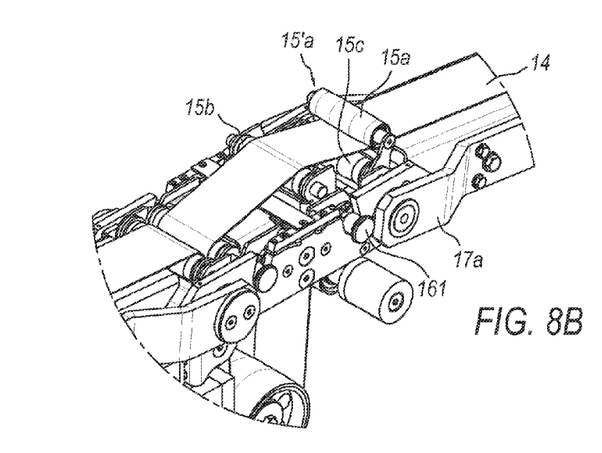
Figure 9:
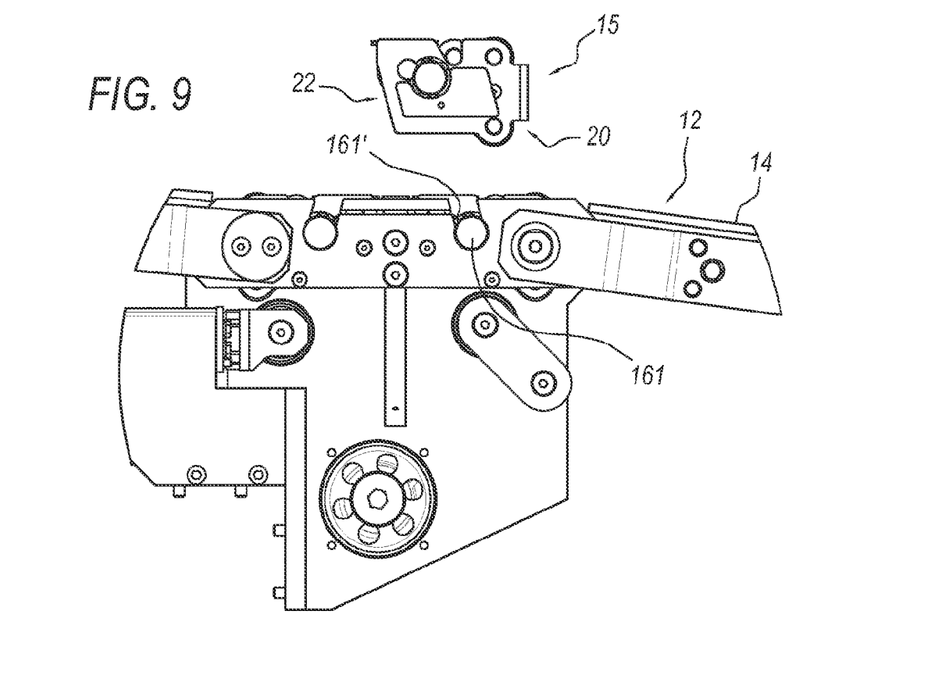
FIG. 9 is a side view of the zone of the conveyor belt where the block for the sliding means is housed, showing in particular the movement by which the block is extracted.
Figure 10A:
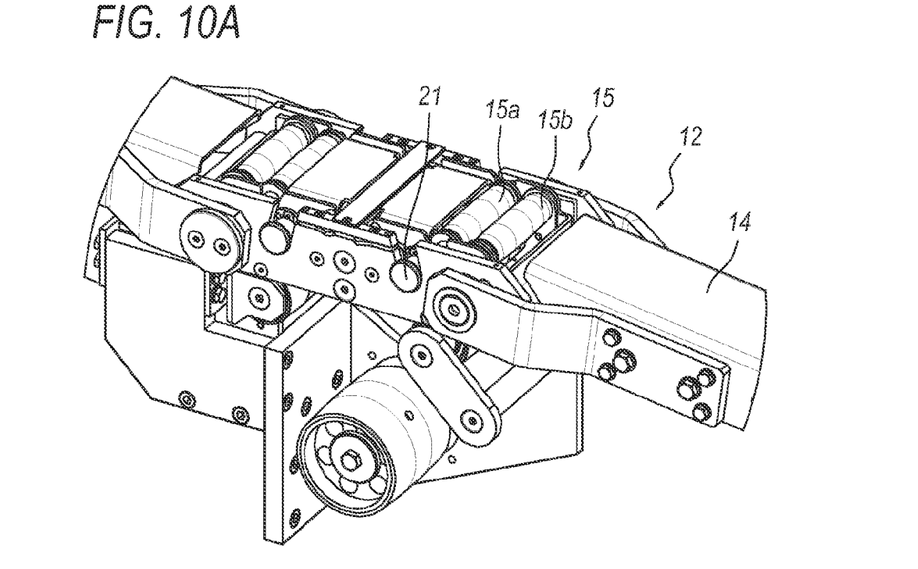
FIGS. 10A to 10C are perspective views of a detail of the conveyor belt, showing the zone where the sliding block is housed and illustrating in particular the movement for extracting the mounting block of the sliding means or rollers according to the invention.
Figure 10B:
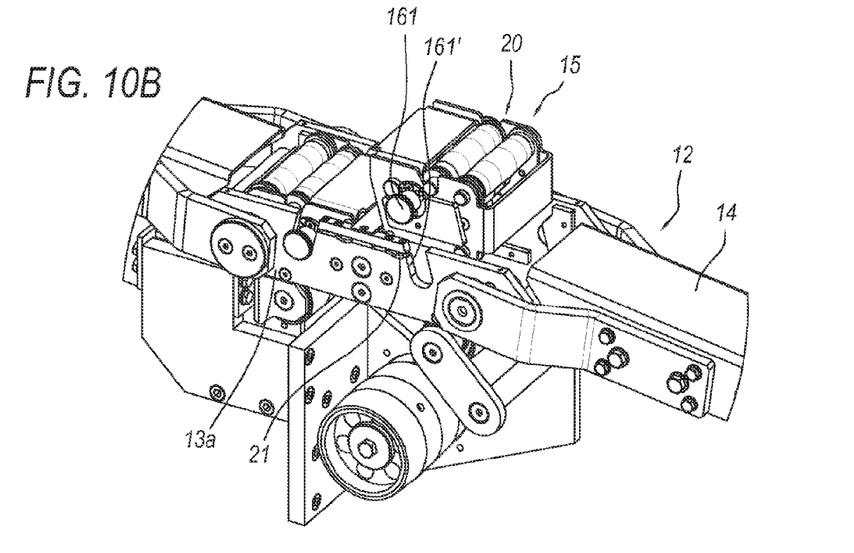
Figure 10C:
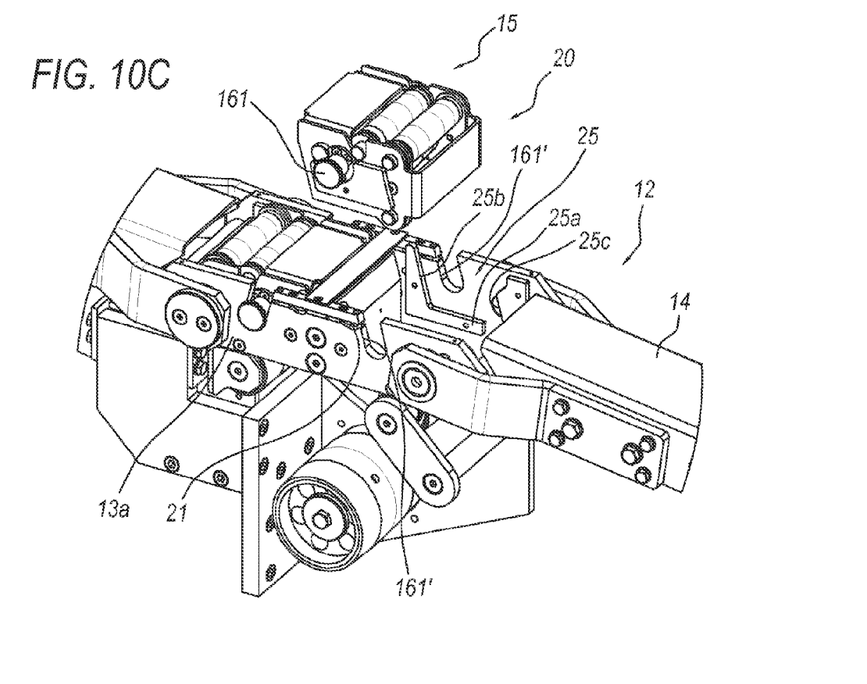
Figure 11A:
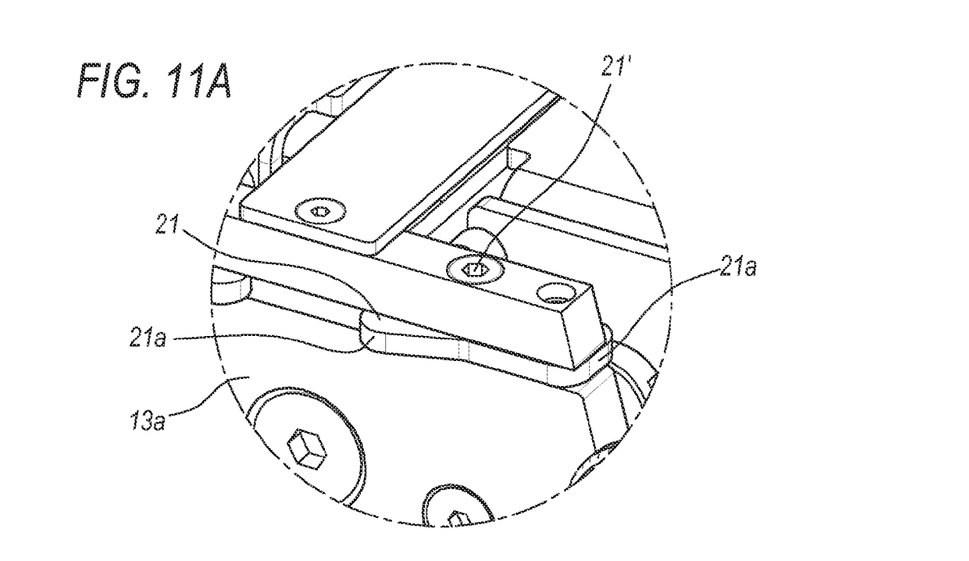
FIGS. 11A and 11B are perspective views of a detail of the retaining means by which the block is held to the conveyor belt, illustrating in particular the position where the mounting block of the sliding means is engaged or retained and the position where it is disengaged or released.
Figure 11B:
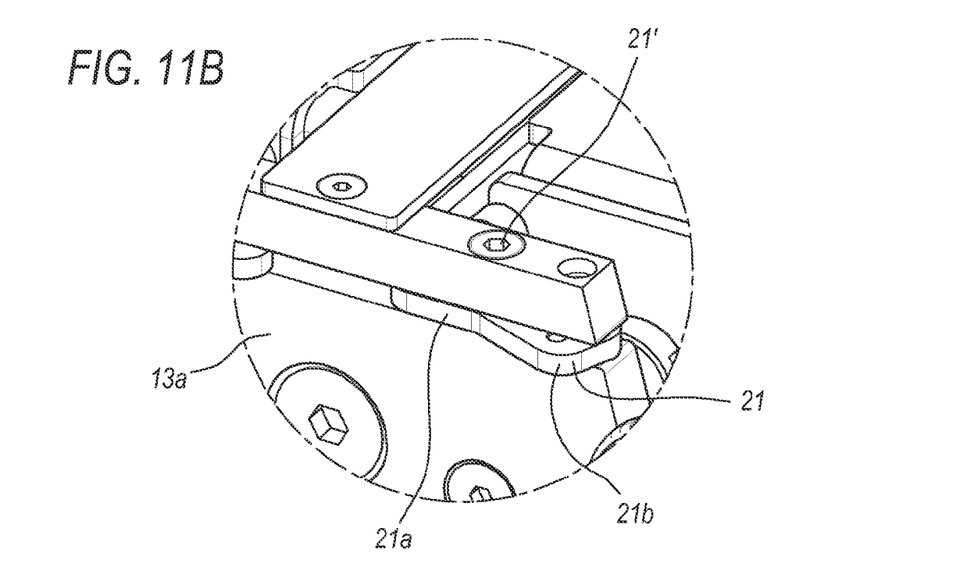

At this point, the respective knob 161 is rotated angularly, in particular through 45°, to reach a stop position, which prevents the respective pin 16, 16 from returning elastically to the locked position, that is, the position inside the respective hole 16', 16', and allows the operator to lift the supporting arm means 17b, 17b of the sliding roller 15b, as shown by the arrows in FIGS. 6A and 7A.

At the same time as the supporting arm means 17b, 17b of the sliding roller 15b are lifted, the supporting arm means 17a of the pulling roller 15a are also lifted, as shown by the arrows in FIGS. 6A and 7A.

Obviously, to re-engage the band 14, the procedure just described is followed in reverse order, by first lowering the roller 15a and then the roller 15b and once again engaging the pins 16, 16 in the respective hole in the supporting arm of the roller 15b.

Advantageously, a mounting block 20 is provided for the sliding means 15 of the endless band 14.

The mounting block 20 for the sliding means 15 of the endless band 14 is advantageously connected to the frame 13a of the conveyor belt 12 by corresponding quick-release retaining means 21a so that the block can be turned and removed from the frame 13a, 13b for cleaning and/or substitution for another block 20 whose sliding means are not worn.

The quick-release retaining means 21 comprise an element for engaging and retaining the block 20, and which is designed to be moved between a position where the block 20 is engaged and connected with the belt mounting means or frame 13a and a position where the selfsame block 20 is disengaged or released from the frame 13a.

The movement of the element for engaging and retaining the block 20 between the engaged position and the position where the block 20 is disengaged is a movement transversal to the block or conveyor belt.

Advantageous elastic means, not illustrated in detail in the accompanying drawings, are provided for pushing the block retaining element 21 to the position where the selfsame block 20 is engaged.

Advantageously, the element 21 for retaining the block 20 in the disengaged position of the selfsame block 20 can be operated manually.

More specifically, means 21a are provided for controlling the element 21 which retains the block 20 in the disengaged position of the selfsame block 20.

More specifically, the operator can set the retaining element 21 of the block 20 manually to the disengaged position of the block 20 by simply pushing or pressing it with a finger.

More specifically, the retaining element 21 of the block 20 is pivoted to the respective flank 13a of the frame of the conveyor belt 12.

More specifically, the retaining element 21 of the block 20 is pivoted in such a way as to rotate about an axis perpendicular to the transporting surface of the belt.

As illustrated the retaining element 21 of the block 20 is in the form of a small elongate plate which is conveniently pivoted at 21' to the frame 13a of the conveyor belt 12.

More specifically, the retaining element 21 of the block 20 is pivoted to the respective elongate plate which is conveniently pivoted to the frame 13a of the conveyor belt 12.

Advantageously, the retaining element 21 of the block 20 has a respective activating end 21a which protrudes laterally outwards from the respective flank 13a of the frame of the conveyor belt 12.

The retaining element 21 of the block 20 has a respective end 21b for engaging the block and which protrudes laterally from the respective flank 13a of the frame of the conveyor belt towards the inside thereof and which acts in conjunction with a corresponding top surface of the block 20, in particular with a corresponding surface, or top face, of the side wall 22a of the casing 22 of the block 20.

The mounting block 20 of the sliding means 15 is supported by the frame 13a, 13b of the conveyor belt 12.

More specifically, the mounting block 20 of the sliding means 15 is housed between the flanks 13a, 13b of the frame of the conveyor belt 12.

In use, the mounting block 20 of the sliding means 15 is under the supporting surface defined by the conveyor belt 12.

Figure 5A:
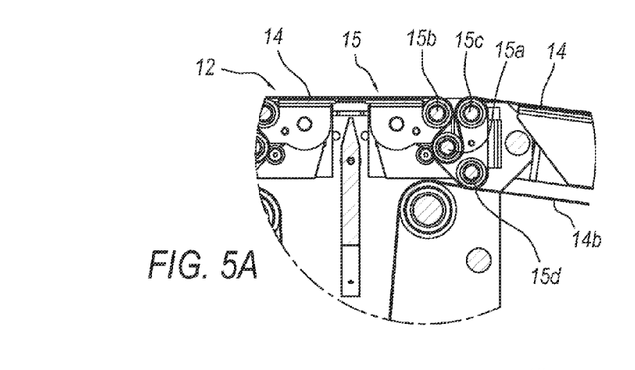
FIGS. 5A, 6A, 7A and 8A are longitudinal cross sections showing the sliding rollers according to the invention in different positions.
Figure 5B:
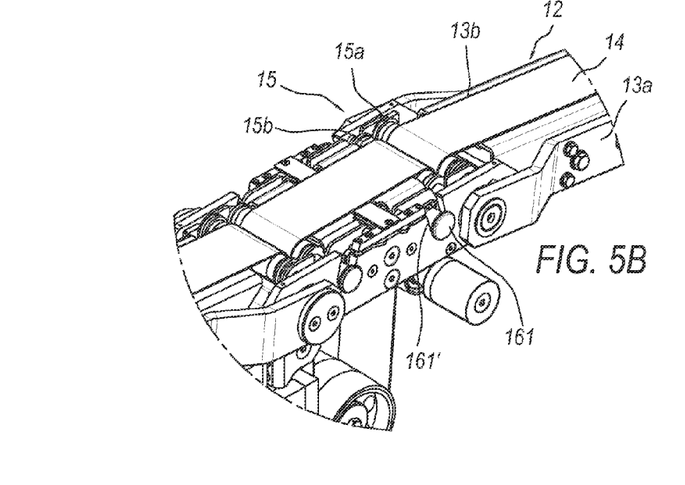
FIGS. 5B, 6B, 7B, 8B show the same positions as those of FIGS. 5A to 8A but in perspective views.

The mounting block 20 of the sliding means 15 also supports a respective tensioning roller 15d for the lower section 14b of the band 14, as may be inferred from FIGS. 2 and 5A.

The tensioning roller 15d for the lower section of the band is, in particular, vertically aligned, or substantially aligned along the vertical, with the shaft of the corresponding second backing roller 15c and is, more specifically, located at a position under the pulling roller 15a, although it is longitudinally offset from the latter.

Obviously, this block is suitable for mounting any of the belt pulling rollers 15a, the first and second band backing rollers 15b, 15c and the tensioning roller 15d for the lower section 14b of the band 14.

Advantageously, the mounting block 20 of the sliding means 15 of the endless band 14 comprises a mounting casing 22.

The mounting casing 22 comprises opposite first and second longitudinal elements, or walls, 22a, 22b connected to each other by opposite first and second transversal elements 22c, 22d defining a respective internal housing for the sliding means 15 of the band 14.

As illustrated, the shaft of a respective backing roller 15c is fixed to the opposite first and second longitudinal elements, or walls, 22a, 22b of the block casing 22.

Further, the surface of rotation of the movable arm means which support the shaft of a backing roller 15b is supported by the opposite first and second longitudinal elements, or walls, 22a, 22b of the block casing 22.

More specifically, the movable arm means 17a which support the shaft of the pulling roller 15a are movable in the internal space between the first and second longitudinal elements, or walls, 22a, 22b of the block casing 22.

As illustrated, the shaft 151b of the movable backing roller 15d has ends which can be inserted into corresponding respective supporting seats 19', 19', open at the top, which are formed in the opposite first and second longitudinal elements, or walls, 22a, 22b of the block casing 22.

The movable arm means 17a which support the shaft of the pulling roller 15a, are supported rotatably on the shaft 151c of the corresponding fixed backing roller 15c, between the corresponding side of the roller 15c and a respective longitudinal element 22a of the block casing 22.

The supporting casing 22 of the block 20, preferably made of metal, comprises insertion and abutment means 24 acting in conjunction with corresponding surfaces 25 on the frame, in particular on the inside surface of the respective flank 13a, 13b of the belt mounting frame.

More specifically, the casing 22 comprises opposite first and second longitudinal elements, or walls, 22a, 22b to which are fixed means 24 for insertion and abutment against corresponding surfaces on the corresponding inside face of the belt mounting frame.

As illustrated, the means 24 for insertion and abutment against corresponding surfaces on the corresponding inside face of the belt mounting frame are defined by a protruding plate 24, which in particular protrudes transversely from the respective longitudinal wall 22a, 22b of the belt.

The plate or insertion means 24 comprises an underside surface 24a for engaging and abutting a corresponding surface, in particular a horizontal surface, 25a of the belt mounting frame.

The plate or insertion means 24 also comprises a lateral surface, in particular an oblique surface, 24b for abutting a corresponding surface, in particular an oblique surface, 25b of the mounting frame which guides the movement by which the block is lowered, in use, to its lower abutment position.

The plate or insertion means 24 also comprises a contact or abutment surface 24c which is longitudinally opposite the downwardly converging surface 24b for guiding the insertion of the block, the contact surface 24b acting in conjunction with a corresponding surface 25c on the selfsame conveyor belt frame.

The retaining element 21 of the block 20 has a respective activation end 21a for disengaging the block 20 and a respective end 21b for engaging the block 20.

In the conveyor, therefore, the block can be removed by simply acting on the plate 21 and lifting the block 20 off the belt.

Obviously, to fit a new block on the belt and re-lock the band 14, the opposite procedure must be followed by disconnecting the block 20 after removing the band 14.

In the conveyor the band can be easily disengaged for convenient cleaning or maintenance purposes.

Moreover, it is also possible for the sliding rollers or similar parts to be quickly and easily replaced because the mounting block of the endless band sliding rollers is easy to remove.

The engagement and disengagement operations respectively suitable for enabling the movement of the sliding rollers and of the roller mounting block can be initiated quickly and easily.

The invention described is susceptible of industrial application. It would be obvious to one skilled in the art that several changes and modifications can be made to the invention without departing from the spirit and scope of the invention, described in depth above. In particular, one skilled in the art could easily imagine further preferred embodiments of the invention comprising one or more of the features described herein.

It will also be understood that all the details of the invention may be substituted for technically equivalent elements.

The invention claimed is:

1. A conveyor (10) for transporting products, including in tissue paper processing installations, the products including rolls of toilet paper, paper towels for personal and general household use, packs of paper napkins, and tissues, the conveyor (10) comprising:
   one or more conveyor belts, for transporting the product between one or more pickup and/or release points, the conveyor (10) comprising:
   a mounting frame (11) for the respective conveyor belt (12),
   the conveyor belt (12) comprising a respective frame (13) for supporting an endless band (14) which transports the product and which runs on a corresponding band sliding unit (15) which can be moved between a normal, lowered position where the endless band (14) is engaged and retained, and a vertically raised position where the endless band (14) is disengaged, the endless band (14) being a selfsame band (14),
   wherein the band sliding unit (15) comprises
   i) a pulling roller (15a) for pulling the endless band (14), the pulling roller (15a) being perpendicularly spaced under the product transporting surface and which defines a path of the endless band (14) which is downwardly recessed relative to the product transporting surface, and
   ii) opposite first and second backing rollers (15b, 15c) for the endless band (14), located at a level of the product transporting surface,
   wherein the pulling roller (15a) creates a recessed path for the endless band (14) with and between the opposite first and second backing rollers (15b, 15c), at the level of the product transporting surface.

2. The conveyor according to claim 1, further comprising means for engaging or retaining the band sliding unit in the normal, lowered position where the endless band is engaged and retained, the means for engaging or retaining being disengageable or releasable manually.

3. The conveyor according to claim 2, wherein the means for engaging or retaining can be set manually to a disengaged position with a single continuous translational action by the user.

4. The conveyor according to claim 2, wherein the means for engaging or retaining comprise a pin (16) for engaging a corresponding surface a mobile supporting means of the band sliding unit (15) and wherein the pin (16) performs a translational movement, in a direction transversal to the belt (12).

5. The conveyor according to claim 1, further comprising mobile mounting means for the band sliding unit (15).

6. The conveyor according to claim 1, wherein the second backing roller (15c) has a rotating shaft which is fixed to corresponding supporting means.

7. The conveyor according to claim 1, further comprising means for retaining the first backing roller (15b) in the normal, lowered position where the endless band (14) is engaged and a pulling action is applied, the means for retaining being releasable to allow the first backing roller (15b) to reach the vertically, raised position where the endless band is released from the pulling action.

8. The conveyor according to claim 7, wherein the means for retaining the first backing roller (15b) in the normal, lowered position where the endless band is engaged and a pulling action is applied comprise a first and a second pin (16, 16), for engaging and disengaging a corresponding surface defining a respective hole (16', 16') for insertion of the corresponding pin (16, 16), located on a respective movable supporting arm (17b, 17b) of the first backing roller (15b), in order to lock the first backing roller (15b) in a working position or to release the first backing roller (15b) to the vertically raised position where the endless band (14) is disengaged, respectively and wherein each of the first and second pins (16, 16) is supported and actuated by a corresponding knob (161, 161) supported by corresponding supporting means.

9. The conveyor according to claim 7, further comprising elastic means for pushing the pin (16), for retaining the first backing roller (15b) in the normal, lowered position where the endless band (14) is engaged and a pulling action is applied.

10. The conveyor according to claim 9, wherein each actuating knob (161, 161) protrudes laterally from the mobile mounting means of the band sliding unit.

11. The conveyor according to claim 1, further comprising a mounting block (20) for respective band sliding unit (15) of the endless band (14) and wherein the mounting block (20) of the band sliding unit (15) is connected to the frame (13a) of the conveyor belt (12) by corresponding quick-release retaining means (21).

12. A conveyor (10) for transporting products, including in tissue paper processing installations, the products including rolls of toilet paper, paper towels for personal and general household use, packs of paper napkins, and tissues, the conveyor (10) comprising:
   one or more conveyor belts, for transporting the product between one or more pickup and/or release points, the conveyor (10) comprising:
   a mounting frame (11) for the respective conveyor belt (12),
   the conveyor belt (12) comprising a respective frame (13) for supporting an endless band (14) which transports the product and which runs on a corresponding band sliding unit (15) which can be moved between a normal position where the endless band (14) is engaged and retained and a position where the endless band (14) is disengaged, the endless band (14) being a selfsame band (14),
   wherein the band sliding unit (15) comprises
   i) a pulling roller (15a) for pulling the endless band (14), the pulling roller (15a) being perpendicularly spaced under the product transporting surface and which defines a path of the endless band (14) which is downwardly recessed relative to the product transporting surface, and
   ii) opposite first and second backing rollers (15b, 15c) for the endless band (14), located at a level of the product transporting surface,
   wherein the pulling roller (15a) creates a recessed path for the endless band (14) with and between the opposite first and second backing rollers (15b, 15c), at the level of the product transporting surface,
   wherein the pulling roller (15a) is movable between a lowered position, where the endless band is engaged, and a raised position, where the endless band (14) is released from the pulling action.

13. The conveyor according to claim 12, further comprising a movable support means (17a) for the pulling roller (15a), and
wherein the movable support means for the pulling roller (15a) comprise a respective supporting arm (17a) which supports a shaft (151a) for rotatably supporting a surface, or a cylindrical element (152a) for engaging and sliding the endless band (14), the supporting arm (17a) being movable to carry the pulling roller (15a) between the lowered position, where the endless band (14) is engaged or pulled, and the raised position where the endless band (14) is released from the pulling action.

14. The conveyor according to claim 13, wherein the movable supporting arm (17a) is pivoted coaxially with a supporting shaft (151c) of the second backing roller (15c).

15. The conveyor according to claim 12, wherein the pulling roller (15a) has a free end (15'a) from which the endless band can be freely removed when the pulling roller (15a) is in the raised position where the endless band (14) is released.

16. The conveyor according to claim 12, further comprising locking means for locking the pulling roller (15a) in the lowered engaged position where a pulling action is applied to the endless band, the locking means being releasable to allow the pulling roller (15a) to reach the raised position where the endless band (14) is released.

17. A conveyor (10) for transporting products, including in tissue paper processing installations, the products including rolls of toilet paper, paper towels for personal and general household use, packs of paper napkins, and tissues, the conveyor (10) comprising:
one or more conveyor belts, for transporting the product between one or more pickup and/or release points, the conveyor (10) comprising:
a mounting frame (11) for the respective conveyor belt (12),
the conveyor belt (12) comprising a respective frame (13) for supporting an endless band (14) which transports the product and which runs on a corresponding band sliding unit (15) which can be moved between a normal position where the endless band (14) is engaged and retained and a position where the endless band (14) is disengaged, the endless band (14) being a selfsame band (14),
wherein the band sliding unit (15) comprises
i) a pulling roller (15a) for pulling the endless band (14), the pulling roller (15a) being perpendicularly spaced under the product transporting surface and which defines a path of the endless band (14) which is downwardly recessed relative to the product transporting surface, and
ii) opposite first and second backing rollers (15b, 15c) for the endless band (14), located at a level of the product transporting surface,
wherein the pulling roller (15a) creates a recessed path for the endless band (14) with and between the opposite first and second backing rollers (15b, 15c), at the level of the product transporting surface,
wherein the first backing roller (15b) is movable between a lowered position, where the pulling roller (15a) is locked, and a raised position, where the pulling roller (15a) is released.

18. The conveyor according to claim 17, further comprising a movable support means (17b) for the first backing roller (15b).

19. The conveyor according to claim 18, wherein the movable support means for the first backing roller (15b) comprises opposite first and second supporting arms (17b, 17b) which, at a respective end, support the shaft (151b) for rotatably supporting the surface, or a element, (152b) for sliding the endless band (14) of the first backing roller (15b), each supporting arm (17b, 17b) being movable in order to carry the first backing roller (15b) between the normal position where the endless band (14) is engaged and a pulling action is applied and the position where the endless band (14) is released from the pulling action.

20. The conveyor according to claim 19, wherein the first and second movable supporting arms (17b, 17b) of the first backing roller (15b) is pivoted at the same height as the shaft (151c) of the second backing roller (15c).

21. The conveyor according to claim 19, wherein the first and second supporting arms (17b, 17b), for supporting the first backing roller (15b) has an end (17'b, 17'b) for engaging the shaft (151a) pulling roller (15a) to define locking means for locking the pulling roller (15a) in the normal position where the endless band (14) is engaged and a pulling action is applied.

* * * * *